US010339821B2

(12) United States Patent
Pao et al.

(10) Patent No.: US 10,339,821 B2
(45) Date of Patent: Jul. 2, 2019

(54) PLATFORM AND KNOWLEDGE-BASED INSTRUCTION ENGINE IMPLEMENTED SKILL-IMPROVEMENT SYSTEM THROUGH CLOUD COMPUTING

(71) Applicants: James Pao, Los Altos Hills, CA (US); Yi-Ching Pao, Los Altos Hills, CA (US)

(72) Inventors: James Pao, Los Altos Hills, CA (US); Yi-Ching Pao, Los Altos Hills, CA (US)

(*) Notice: Subject to any disclaimer, the term of this patent is extended or adjusted under 35 U.S.C. 154(b) by 0 days.

(21) Appl. No.: 14/335,845

(22) Filed: Jul. 18, 2014

(65) Prior Publication Data

US 2017/0352284 A1 Dec. 7, 2017

Related U.S. Application Data

(60) Provisional application No. 61/958,251, filed on Jul. 24, 2013.

(51) Int. Cl.
*G09B 5/08* (2006.01)
*G09B 5/06* (2006.01)

(52) U.S. Cl.
CPC .............. *G09B 5/08* (2013.01); *G09B 5/065* (2013.01)

(58) Field of Classification Search
CPC ....... G09B 5/08; G09B 5/065; G09B 19/0038
USPC ......................................................... 434/252
See application file for complete search history.

(56) References Cited

U.S. PATENT DOCUMENTS

| | | | |
|---|---|---|---|
| 2002/0115046 A1* | 8/2002 | McNitt | A63B 24/0003 434/252 |
| 2014/0234814 A1* | 8/2014 | Krosky | G09B 5/02 434/236 |

* cited by examiner

*Primary Examiner* — Thomas J Hong
(74) *Attorney, Agent, or Firm* — Weiss & Moy, P.C; Jeffrey D. Moy (57) ABSTRACT

Methods and apparatuses for generating feedback to a human practitioner practicing a skill using a combination of local platform, the internet, and cloud-based analysis engine are disclosed. The local platform is employed to provide physical parameter data pertaining to the human practitioner (or part/parts thereof) and to the object involved in practicing the skill. Cloud-based technology is leveraged to provide analysis to physical parameter data acquired by the local platform and to generate feedback to the human practitioner. Cloud-based technology is also leveraged to provide analysis resources to the cloud-based analysis engine and feedback resources to provide/enhance the feedback to the human practitioner.

18 Claims, 6 Drawing Sheets

PLATFORM AND KNOWLEDGE-BASED INSTRUCTION ENGINE IMPLEMENTED SKILL-IMPROVEMENT SYSTEM THROUGH CLOUD COMPUTING

PRIORITY CLAIM

The present invention claims priority under 35 USC 119(e) to an earlier filed provisional patent application entitled "Platform and Knowledge-Based Instruction Engine Implemented Skill-Improvement System through Cloud Computing" filed by the same inventors James Pao and Yi-Ching Pao herein (Application No. 61/958,251, Filed in the USPTO on Jul. 19, 2013), which is incorporated by reference for all purposes.

BACKGROUND OF THE INVENTION

There are situations, especially in motion intensive sports such as golf, baseball, soccer, tennis, archery, and shooting, where the movements of objects or persons are paramount to the game, and a player constant strives to improve or perfect such movements. For example, a player may wish to understand and seek instant feedback regarding the motion (encompassing for example one or more physical parameters, such as a velocity, acceleration, trajectory and spin, impact point, impact timing, etc.) of any pertinent play objects such as balls, rackets, and clubs, as well as to seek identification and improvement of deficiencies and mistakes in the player's technique.

In prior art US Patent Publication 2012/0276512 A1 (Published on Nov. 1, 2012) and/or US Patent Publication 2010/0081116 A1 (Published on Apr. 1, 2010) examples of commercial videotaping arrangements to capture and send video images through Internet for storage and human interpretation are disclosed. However, such systems are suitable primarily for one-on-one human coaching, albeit coaching from a location remote from the player, and are incapable of or become very inefficient when for example scaled up to accommodate multiple players.

Hence improved arrangements and methods for play objects and/or player position/motion analysis and for providing coaching/feedback are desired.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include any of the data processing devices, including for example smart phones, tablet computers, laptop computers, or a general-purpose computers and/or dedicated computing devices when appropriately programmed and may include a combination of a computer/computing device and dedicated/programmable circuits adapted for the various tasks pertaining to embodiments of the invention. Such a data processing device include, as is well-known, at least a processor unit, a memory unit, a graphic processing unit, a data storage unit (such as a hard drive or semiconductor-based data storage device), one or more I/O circuits, one or more data communication sub-systems, and/or operating system/applications for executing executable code. Data processing devices are well-known and are not discussed in greater detail herein for brevity's sake. The apparatuses may be stand-alone or may be coupled together using a network, such as a local area network, an intranet, an internet, or an combination thereof.

Embodiments of the invention relate to physical platforms, including hardware architecture and software framework/algorithm, and methods using those platforms in connection with a knowledge engine through internet-based cloud computing to provide automatically-generated (i.e., non-human-assisted) skill instructions, coaching, and improvement to the players. The skills sought to be improved may include, but are not limited to, sports such as golf, baseball, soccer, archery, and shooting.

As the term is employed herein, a platform includes hardware architecture and software framework wherein the combination allows application software to execute on such combination and to acquire needed physical measured data and information pertaining to play objects (e.g., balls, racquets, bats, clubs, etc.) and players. Also as the term is employed herein, a knowledge engine refers to algorithm which links pre-defined "input parameters" to at least one solution or instruction set from its knowledge database. Further, as the term is employed herein, cloud computing refers to computing resources that are delivered as a service over a network, typically the Internet. Cloud computing may sometimes be referred to as "on-demand software" and may be priced on a pay-to-use basis such as a subscription fee.

In one or more embodiments, the platform first acquires relevant physical measurements of parametric data pertaining to play objects and/or players. Then the data is processed and sent to the knowledge engine through Internet connections to analyze players' skill levels, deficiencies, mistakes, and areas needing improvement.

After receiving and analyzing the data sent by the platforms, the knowledge engine utilizes an analysis algorithm to identify potential faults in the players' techniques, and to suggest any corrective actions, practices, and pertinent advices to remedy any skill issues. In one or more embodiments, the knowledge engine contains a working knowledge algorithm that links the platform-captured data to corresponding instructions and/or coaching data within its databases. The databases can be open sourced and/or publically shared on the Internet, and/or may include proprietary instructions created in advance. The data of the databases may be stored by the cloud service provider to render the needed coaching instruction to the players on a real time computation and instant feedback basis.

An activity of particular interest to this invention is the sport of golf. For this reason, golf will be used as the primary example herein although it should be understood that the invention and/or its one or more embodiments are not limited only to golf.

Generally speaking, a well performed golf strike consists of a multitude of factors. For example, considerations must be given to the playing course's topographic qualities, as well as spatial layouts and weather conditions. Beyond these, a golf player must be sure to use situationally appropriate gear, such as the correct club. Once appropriately equipped, the player must perform the swing with the club to strike the golf ball to or towards the target. This strike is an exceptionally complex compound action, composed of large actions and smaller more subtle actions. In this example, both the golf ball and the club represent play objects for data collection and analysis purposes.

Player technique considerations include for example feet positioning relative to one another, body positioning relative to the ball, lateral head and body movements during the swing, arm positioning during the swing, forearm and upper-arm angle during the swing, torso rotation during the swing, pivoting of the feet during the swing, rotation of the club during the swing, club face angle during contact with the ball, arm and club positioning immediately before and after the swing, and velocity of the swing.

The factors listed, along with other secondary factors, can affect for example the quality and effectiveness of the swing and consequently the quality of the shot. The ball speed, trajectory, and spin can all be affected, leading to a large range of shot effectiveness, given a certain game situation. Therefore, it is of extreme interest to develop an ability to determine any flaws in technique in order to improve and perfect the skills necessary to consistently achieve the perfect swing and strike to allow the player to place the ball as close to the target as physically and situationally possible.

In order to achieve real time computation and instant feedback, including retrieving corrective instructions/feedback from the knowledge engine, there is implemented in one or more embodiments a local platform that is capable of (1) measuring all physical parameters relating to the players' skill assessment (including physical parameters pertaining to the play objects and to one or more body parts of the player for example), (2) calculating and converting all measured physical parameters and/or images into predetermined and simplified numerical data of a pre-defined format, and (3) communicating with designated servers via a network such as the internet where the knowledge engine and databases reside with the cloud service provider. As mentioned, the measured physical parameters may include but not limited to those pertaining to played objects such as ball, club, racket, and body motions, speeds, angles, trajectories, and video images.

The local platform is of critical importance since it is used to perform physical data capture, measurement, conversion, and communication with the knowledge based instruction engine through Internet for instant instructional feedback. In one or more embodiments, certain calculations may be made by the local platform if desired prior to transmitting the information pertaining to the physical parameters to the knowledge based instruction engine or after receiving information pertaining to feedback from the knowledge based instruction engine.

Once the platform is adequately configured and widely distributed, multi-platform communication involving multiple local platforms communicating with a single designated knowledge engine and associated instruction database through Internet may be made using cloud computing architecture to leverage on the power of Internet. In this manner, huge scalability may be easily achieved.

The invention relates, in an embodiment, to a method for generating feedback to a human practitioner practicing a skill, comprising a) providing a local platform for acquiring physical parameter data pertaining to at least one of a motion and a position of at least one of the human practitioner and an object involved in practicing the skill; b) transmitting via the internet at least a portion of the physical parameter data from the local platform to a cloud-based analysis engine, the cloud-based analysis engine implemented via a cloud-based paradigm and is located geographically remotely relative to the local platform; d) receiving via the internet the feedback from the cloud-based analysis engine; and e) providing the feedback to the human practitioner using at least one of an audio means operatively coupled with the local platform and a visual display means operatively coupled with the local platform.

In another embodiment, the invention relates to method for generating feedback to a human practitioner practicing a skill, comprising providing a cloud-based analysis engine; b) receiving via the internet physical parameter data from by use of a local platform, the physical parameter data pertaining to at least one of a motion and a position of at least one of the human practitioner and an object involved in practicing the skill; c) analyzing the physical parameter data to generate the feedback; and d) providing the feedback via the internet to the local platform.

In yet another embodiment, the invention relates to a method for generating feedback to a human practicing golf strokes, comprising: providing a knowledge-based instruction engine, the knowledge-based instruction engine implemented on a set of host servers in accordance with a cloud-based paradigm; providing a database of data pertaining to motion of at least one of a golf club and at least one human body part; b) receiving via the internet physical parameter data from by use of a local platform, the physical parameter data pertaining to at least one of a motion and a position of at least one of the human and the golf club; c) analyzing, using the knowledge-based instruction engine, the physical parameter data to generate the feedback, wherein the analyzing also includes utilizing the database; and d) providing the feedback via the internet to the local platform.

In various embodiments herein, the skill can be a game (such as golf, basketball, etc.) or one that is related to a vocation (e.g., assembly, welding, sorting, computer hardware/software work etc.) or physical conditioning/physical therapy for a human (e.g., injury rehabilitation, strength improvement, muscle building, endurance building, etc.) or general human entertainment/activity (e.g., dancing, running, flying a plane, driving a car, etc.). The object involved in practicing the skill can be any instrument or equipment employed with the skill (e.g., golf club, tennis racquet, assembly tool, physical training equipment, vocational equipment etc.)

The features and advantages of various embodiments of the invention may be better understood with reference to the figures and discussion below.

Figure 1:
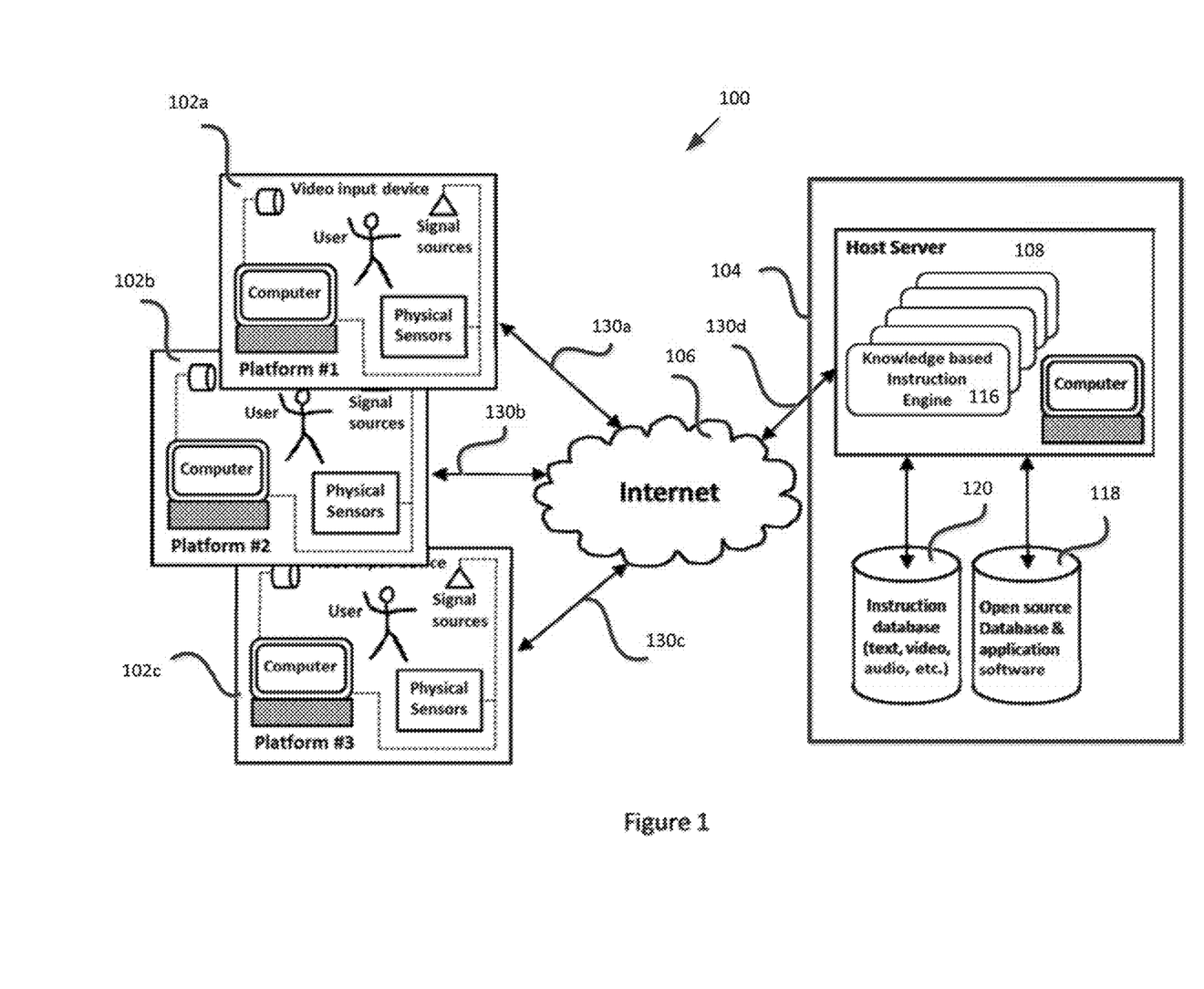
FIG. 1 shows, in accordance with an embodiment, an arrangement wherein multiple local platforms communicate with a cloud-based knowledge engine through Internet for physical data sensing and feedback purposes.

FIG. 1 shows, in accordance with an embodiment, an arrangement 100 wherein multiple platforms 102a, 102b, and 102c communicate with a designated knowledge engine 104 through Internet 106 for physical data sensing and feedback purposes. The knowledge engine 104 is hosted on remote servers (108) and includes and/or has access to knowledge-based instruction engine 116, instruction decision making algorithm (118) and associated databases (120) to render needed skill set improvement instructions or coaching/feedback, either through text, graphs, audio, video, or a combination of above.

In FIG. 1, each platform (102a, 102b, or 102c) may include a combination of Internet connecting devices, light or free space signal sources, physical sensing devices, video/image capturing devices, and local computation and data processing devices. The main function of the platform is to capture the required physical parameters associated with the motion of the play objects and of the players, and then perform local computation, analysis, and data conversion of parametric values acquired. The platform (102a, 102b, and/or 102c) then formats the processed results into a streamlined and simplified data stream (130a, 130b, 130c or 130d) to communicate with the knowledge engine 104 through Internet connections. Once analysis is done by knowledge engine 104, the platform (102a, 102b, and/or 102c) then retrieves/receives and displays corresponding feedback from the knowledge based instruction engine 116 and associated databases (118/120) of knowledge engine 104 on a real time and instant basis.

One or more embodiments of the invention may be specifically intended for the data capture and analysis of a player's golf swing, as well as the simulation of the golf ball's behavior after it has been struck. An example of a golf simulation and analysis platform, which can be used as the basis for the platform component of this invention, is detailed in issued U.S. Pat. No. 6,302,802, which is incorporated by reference herein.

Further, a frameless platform system as discussed in pending US patent publication 20140024470 (patent application Ser. No. 13/556,027 entitled "Golf Analysis System with Frameless Optical Sensor Net", filed on Jul. 23, 2012 and incorporated by reference herein) by the authors of this invention may consist of two ceiling mounted laser emitters and laser detector arrays positioned on the ground below the emitters. The laser emitters are positioned in a manner such that each emitter emits a fan of laser light that are close and parallel, but not within the same plane.

The detector arrays upon the ground are also separated into two sets of detectors. One set detects light from a single emitter, while the second set detects light from the other emitter. The detector array consists of detectors in discretely placed at set intervals, rather than continuously. Due to this arrangement, the effective light emitted, which is the light that can be detected by the detector array, will be separated discrete laser beams originating from the emitter to each individual detector. The two emitters may be positioned in a manner where they are a certain distance away from one another lengthwise.

Figure 2:
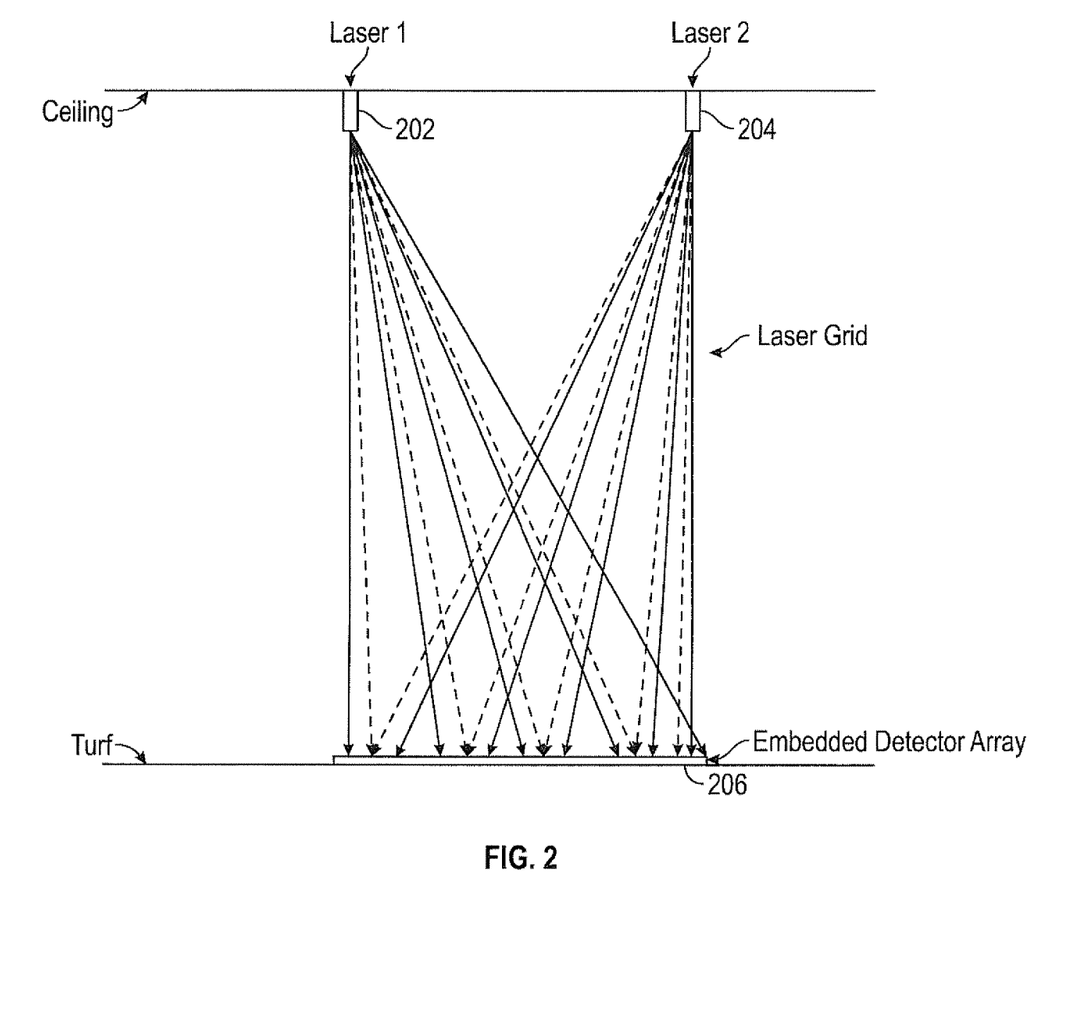
FIG. 2 shows, in accordance with an embodiment of the invention, an arrangement for sensing physical parameter data pertaining the play object(s) and/or the player.

This arrangement may be seen in FIG. 2. In FIG. 2, the two sets of emitter 202 and 204 and detectors 206 create a functional optical net (laser grid), which is presented before the player. The player swings and strikes the ball (not shown) through the optical net. The specific emitter-detector combinations that are interrupted, as well as the order and time of interruption, and the time duration of each interruption, allows an appropriate algorithm to determine multiple factors comprising the golf swing and strike, including club and ball speed, club swing path, club face angle upon contact with the ball, trajectory of the ball, and spin of the ball. In previous iterations of the golf simulation and analysis platform, most recently in the configuration presented in FIG. 2 of the aforementioned US patent publication 20140024470, this information is captured, processed, and displayed to the player in a graphical user interface (GUI) presented on a commercially available computer.

In an embodiment, an analogous arrangement to FIG. 2 in conjunction with the video input device and/or the computer of the platform may be employed to capture, process, and present the data to the player. This allows the player to understand not only the results of their swing and strike, simulated and visually displayed on the GUI, but also understand the dynamics of the club swing and ball hitting processes that led to the result analyzed by the knowledge based instruction engine.

Embodiments of the invention may further improve the data capture and processing ability of the physical platform by using a video camera and image processing software to capture the entire player's head, body, limbs, legs, and club as the player swings and strikes the golf ball. After capture, the image processing software is then able to subtract and reduce background imagery and extraneous factors and isolate the vital aforementioned components.

Figure 3:
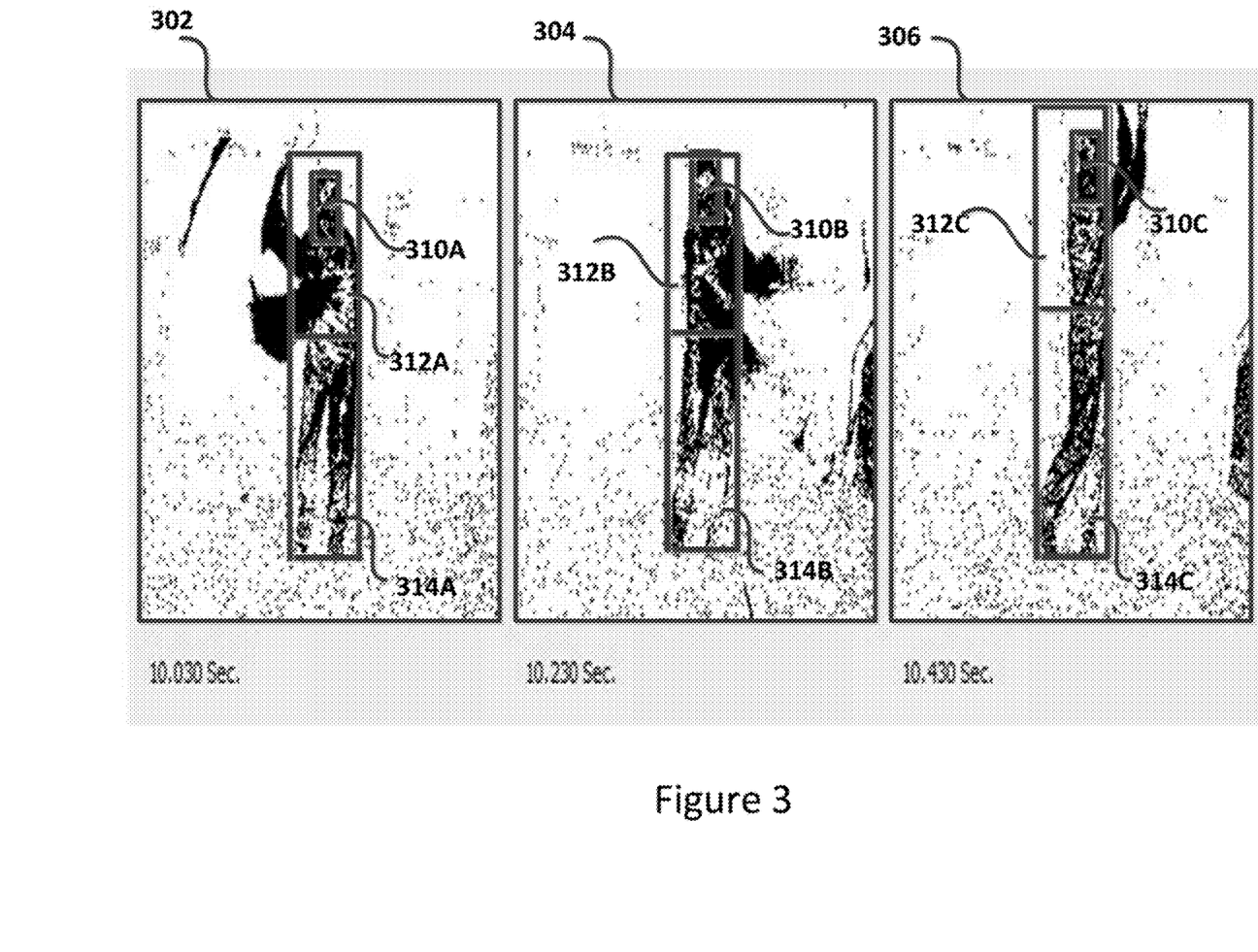
FIG. 3 shows, in accordance with an embodiment of the invention, a technique for sensing player body part position and/or motion from video images.

In one or more embodiments, the captured data is divided into several discrete image sub-frames, for example 3 to 5 sub-frames as depicted in FIG. 3. Within these sub-frames 310A, 312A, and 314A of video frame 302 (as well as sub-frames 310B, 312B, and 314B of video frame 304 and sub-frames 310C, 312C, and 314C of video frame 306, with video frames 302, 304, and 306 being about 200 mS apart in the example of FIG. 3), the software is able to identify and mark the individual key body components, such as head, waist, legs, and arms. By comparing corresponding sub-frames over time, the software is able to identify how the player's head, body, and limbs had moved over the course of the swing and strike at predetermined exact moments.

This information, along with the information regarding club and ball behavior obtained from the laser optical net, may be captured and processed locally by the platform component of this invention. Once processed, the local platform may send, via an appropriate computer and internet connection (which may be wired, wireless, or optical), the information in a compressed format to the cloud-based knowledge instruction engine 116 of knowledge engine 104. The knowledge instruction engine 116 will process the information received from the platform through a fault detection procedure, and respond with appropriate action correction and improvement suggestions.

Figure 4:
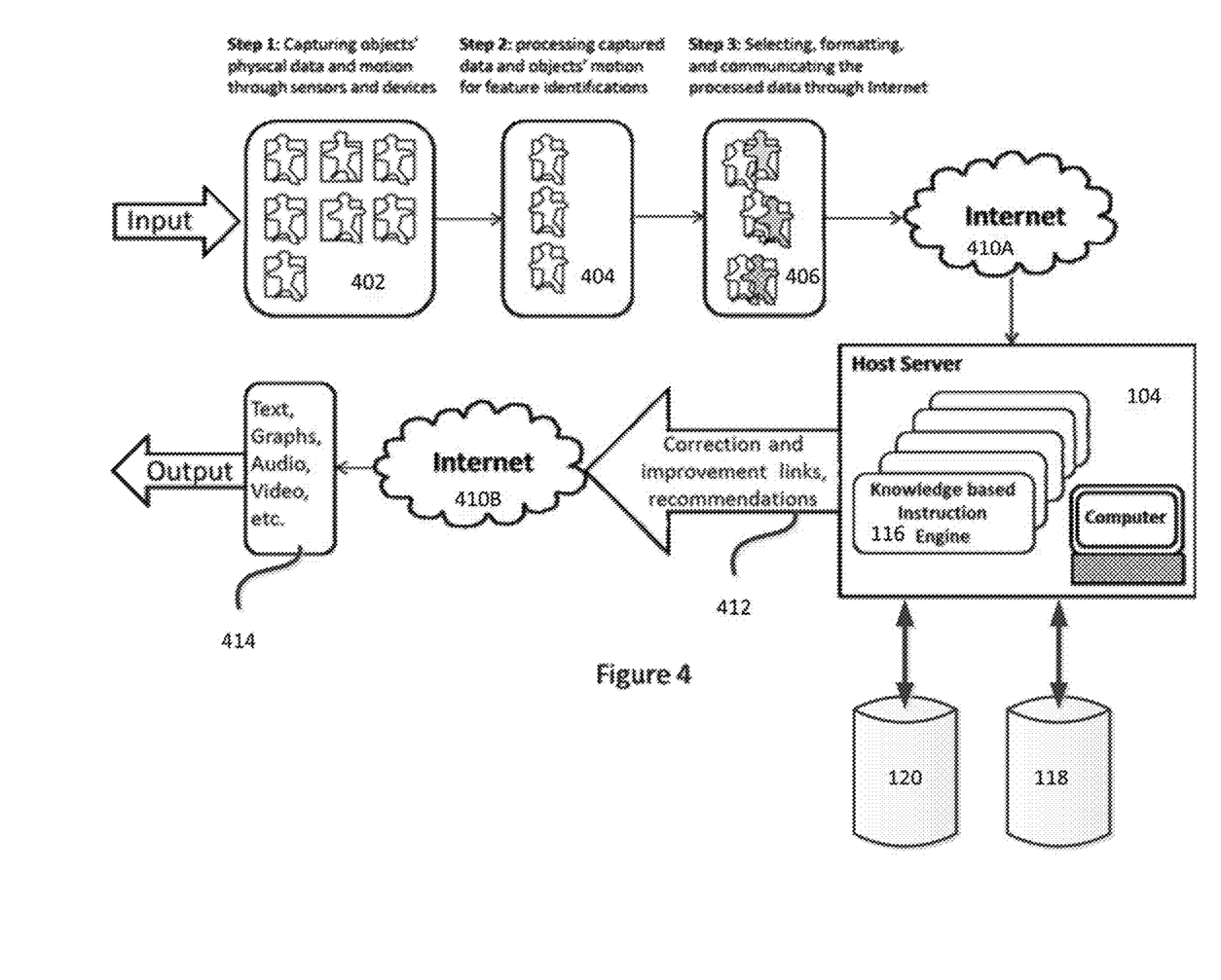
FIG. 4 describes in more details of the features, functions, and relationship between the platform (such as 102a) and the designated knowledge engine (such as 104) through Internet connections, in accordance with one or more embodiments of the invention.

FIG. 4 describes in more details of the features, functions, and relationship between the platform (such as 102a) and the designated knowledge engine (such as 104) through Internet connections, in accordance with one or more embodiments of the invention.

In FIG. 4, each platform (not shown) may perform a set of pre-defined physical measurements (using appropriate sensors and/or cameras) including, but not limited to, those pertaining to attributes of the play objects (balls, clubs, rackets, etc.) and of the players. These attributes may include for example, start position, ending position, intermediate position, velocity, acceleration, angle, trajectory, etc. Further, video images of the player body and motion of the played objects may also be obtained. The attributes and images are part of the "Input" shown in FIG. 4.

After measuring and acquiring (Step 1/402) the physical parametric data and images, the platform conducts local computation and data analysis (Step 2/404), and then formats the calculated data into a pre-configured and streamlined format (Step 3/406) to communicate with the knowledge based instruction engine through Internet (410A).

After analysis by the knowledge engine 104, the platform receives the feedback of suggested corrective and skill improving instructions (412) from knowledge engine 104 via the internet (410B) to communicate back to platform users. The platforms' OUTPUT formats can be in text, graphs, audio, video, or a combination of all above (414).

This informational input and output process may be employed, in an embodiment, to assist the player in improving his or her golf swing technique.

In an embodiment, the platform records data from two paths. The first path pertains to the club and ball motion data from the optical net, as described in the aforementioned issued U.S. Pat. No. 6,302,802 and US patent publication 20140024470, both of which are incorporated by reference herein).

The second path pertains to the video capture camera and image processing software that identifies the player's bodily motion through the swing. This combination of data may be captured and processed locally by the platform component, and the processed result may be sent to knowledge engine 104 for analysis. Alternatively or additionally, some of the data processing after capture may be performed by remote servers if desired.

The knowledge engine 104, via appropriate algorithms and software, can then determine faults in the performance result, such as a shanked drive, and also detect the flaw or flaws in the player's techniques that contributed to the poor result. The determination of these faults and flaws can also be processed locally, after comparison to pre-determined parameters for a successful swing and strike. However, it is preferable that part or all of the fault determination be performed remotely by a cloud based knowledge engine via the Internet. This would allow for any technique parameters deemed necessary for a successful swing and strike to be updated at any time, constantly, and in a centralized manner to ease maintenance burden if new knowledge is compiled from expert sources.

In one or more embodiments, the cloud based knowledge engine 104 that includes at least both specific algorithms and instructional databases, may utilize existing internet infrastructure, such as a video hosting site (e.g., Youtube™) or an audiovisual hosting site or a social media platform, to host a library of feedback information. The feedback information can range from text-based direction, audio-based direction, graphics and images, and most importantly video clip direction. The feedback information may be organized in a manner that allows the knowledge engine 104 to automatically (i.e. without human involvement from the data collection pertaining to played objects/players to feedback providing) consider the ascertained technique flaws and determine appropriate feedback, such as a collection of videos, to be extracted from the database and presented to the player locally, on the platform component at a computer monitor, for example.

By placing this feedback information on a cloud-based database such as an audio/video hosting site, the information can be constantly updated, improved, and expanded at a single centralized location to allow for more feedback that can be accessed quickly by multiple worldwide players. This instant request-and-receive process, much like most internet pages, will be loaded only when necessary. Accordingly, the memory requirement at the local platform component is much less than would have been the case if the feedback database is hosted locally at the platform.

Further, if all information is stored locally, then outdated feedback information must be constantly tracked for each local platform and deleted and new information must be constantly downloaded for local storage. In this scenario, the maintenance burden is much higher, and so is the memory requirement at each local platform.

For further information regarding sensing and determining physical data pertaining to the motion of the play object and/or of the player, please refer to the aforementioned US patent publication 20140024470 (patent application Ser. No. 13/556,027 entitled Golf Analysis System with Frameless Optical Sensor Net, filed on Jul. 23, 2012 and incorporated by reference herein).

Figure 5:
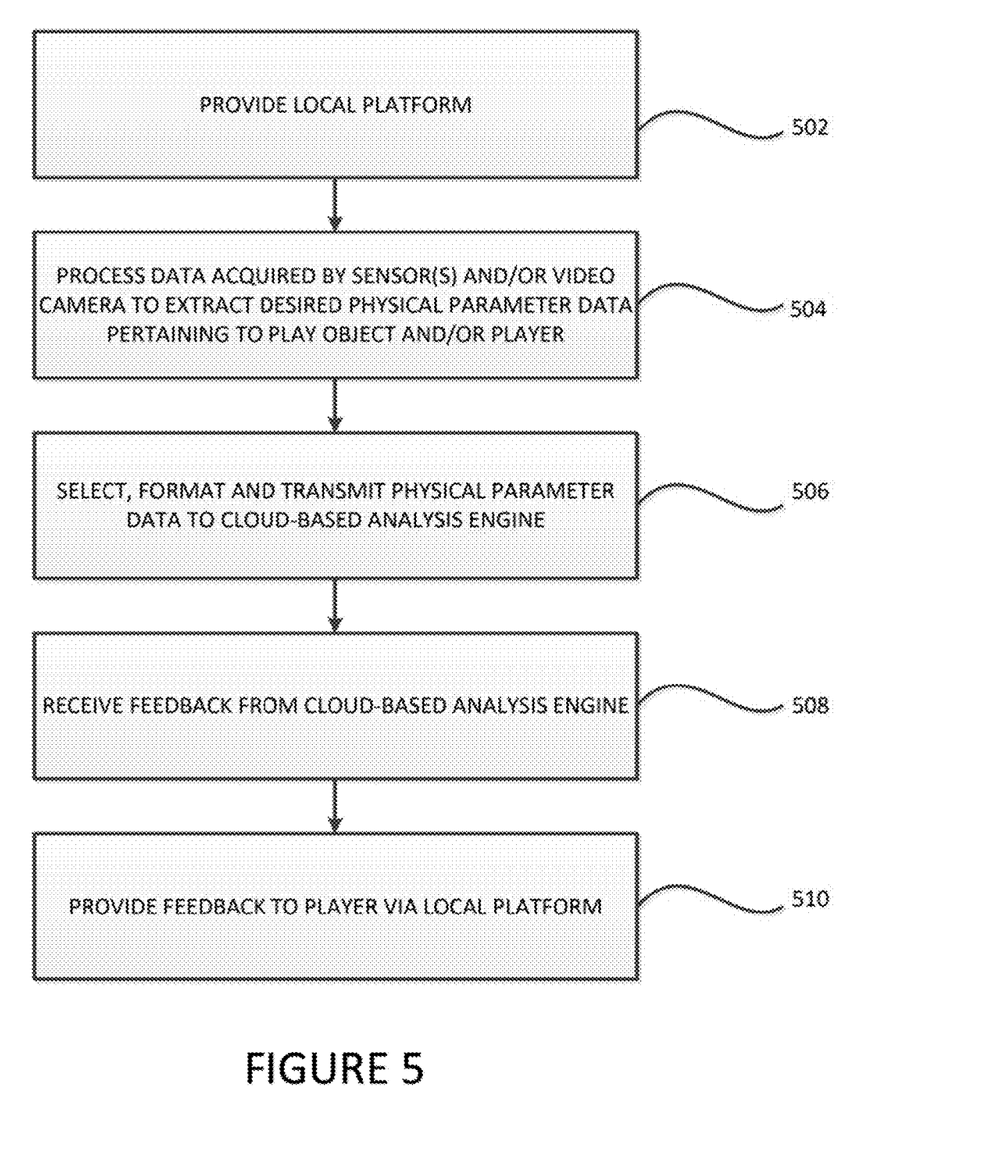
FIG. 5 shows, in accordance with one or more embodiments of the invention, the steps for implementing sensing/analyzing/providing feedback employing the local platform.

FIG. 5 shows, in accordance with one or more embodiments of the invention, the steps for implementing sensing/analyzing/providing feedback employing the local platform. In step 502, a local platform is provided. The providing the local platform includes providing a sensor arrangement for acquiring physical parameters pertaining to position and/or motion of the play objects as well as of the players. With respect to the golf example, the sensor arrangement would be employed to sense and determine physical parameters pertaining to position and/or motion of the golf ball and the club as well as of certain body parts the player. In an embodiment, the type of club and/or the type of ball may also be sensed by the sensors or otherwise inputted into the local platform.

The providing the local platform may also include providing a video camera arrangement for capturing images and/or clips of the play objects. The providing the local platform may also include providing image processing software and/or hardware to acquire physical parameter data from the images acquired by the video camera.

The providing the local platform may also include providing software and/or hardware to enable data processing locally to prepare the physical data to be transmitted or more efficiently transmitted in the format that may be utilized by the cloud-based analysis engine for analysis.

The providing the local platform may also include providing software and/or a monitor for displaying visual/audio/textual/video feedback to the player after the physical data has been analyzed by the cloud-based analysis engine and feedback has been transmitted to the local platform from the cloud-based database.

In one or more embodiments, the user may purchase off-the-shelf components and the providing the local platform comprises providing software and/or software framework to enable interoperability of off-the-shelf components (e.g., video camera, monitor, modem, sensors and/or computer etc.) to enable these off-the-shelf parts to cooperate and perform the functions of acquiring physical data from sensors and/or video camera as well as to process the acquired data for transmitting or more efficiently transmitting the data to the cloud-based analysis engine via the internet for analysis. In this case, the providing the local platform may include providing software and/or software framework to enable receiving the feedback from the cloud-based analysis engine and to display the feedback to the player on the appropriate user interface components (e.g., speaker and/or monitor and/or motion feedback) provided by the user.

In step 504, the local platform processes the data acquired by the sensors and/or the video camera and identify or extract the relevant physical parameter data (e.g., the aforementioned start position, ending position, intermediate position, velocity, acceleration, angle, trajectory, etc.).

In step 506, the local platform selects, formats, and transmits the physical parameter data to the cloud-based analysis engine via the internet. The selecting and/or formatting enables data to be sent or more efficiently sent in the format usable or understandable by the cloud-based analysis engine. In one or more embodiments, since a server may serve multiple local platform, the physical parameter data preferably is associated with data that can identify the local platform and/or player and/or receive port and/or IP address that can differentiate the various local platforms served by a single cloud-based analysis engine. Further, time-stamping or number sequencing may be associated with the input data sent by the local platform to identify a particular batch of data so that feedback can be provided for that batch of data (e.g., the current golf stroke from a given player and not the golf stroke that precedes it).

In step 508, the local platform receives the feedback via the internet from the cloud-based analysis engine.

In step 510, the local platform displays or otherwise provides the feedback to the player.

In one or more embodiments, the steps of FIG. 5 are completely automated (i.e., without human intervention). Although humans may initially configure the local platform and/or power on the local platform, it is preferable that the software/hardware of the platform performs the steps of FIG. 5 subsequently in a completely automatic manner for each sensing/transmitting/feedback cycle (e.g., for a golf stroke and automatically for each subsequent golf stroke) without requiring human intervention. Of course humans can intervene (e.g., to freeze the display of feedback, to replay certain feedback information) in an optional manner if desired.

Figure 6:
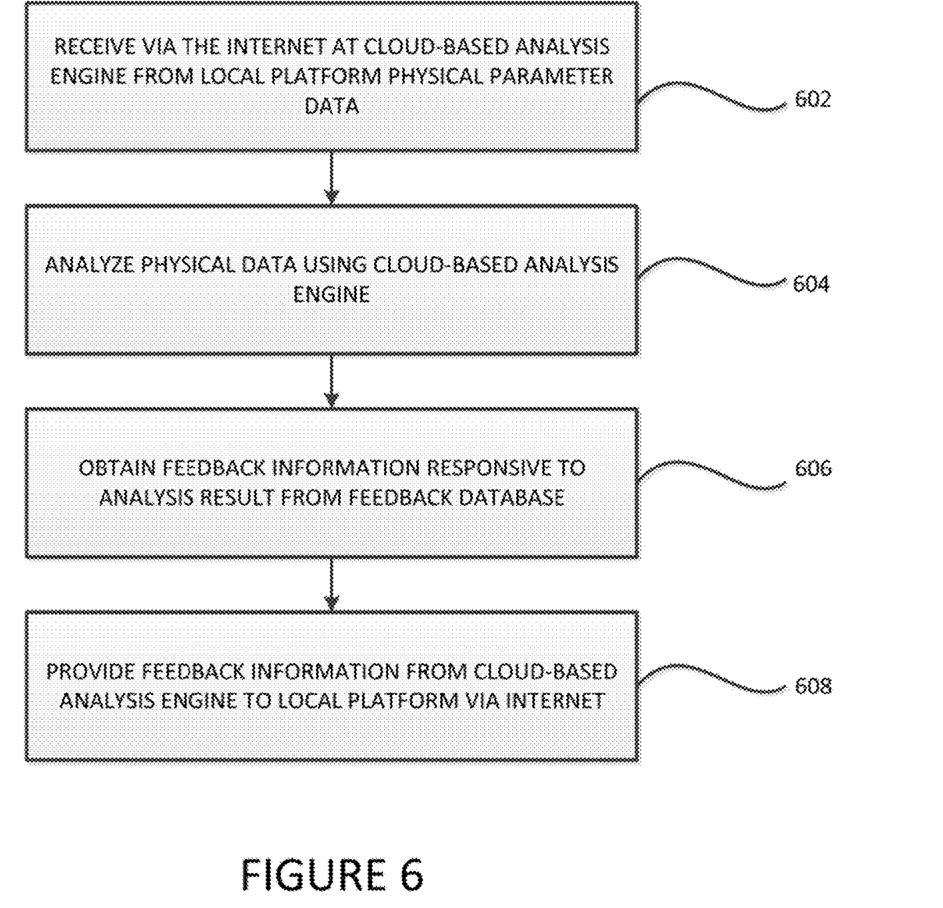
FIG. 6 shows, in accordance with one or more embodiments of the invention, the steps for analyzing and providing feedback by the cloud-based analysis server.

FIG. 6 shows, in accordance with one or more embodiments of the invention, the steps for analyzing and providing feedback by the cloud-based analysis server. In step 602, the physical parameter data pertaining to the play object(s) and the player is received from the local platform via the internet.

In step 604, the analysis engine employs the knowledge-based instruction engine to analyze the physical data. The analysis may involve accessing the knowledge database pertaining to position/motion of the play objects and/or of the player and/or of the body part(s) of the player such that comparison between the input data and the reference data may be performed. The knowledge base may be implemented with the cloud-based analysis server or may itself be implemented as a cloud-based database and accessed by the cloud-based analysis engine using a cloud-based methodology. As mentioned, cloud-based implementation provides advantages at least in terms of load balancing, scaling, and ease of maintenance.

Alternatively or additionally, the analysis may involve performing algorithmic computation (which may involve artificial intelligence or machine learning) on the received physical data.

Once analysis is performed, the analysis engine selects the appropriate feedback to provide via the internet to the local platform (606). The appropriate feedback is based on the result of the analysis. In one or more embodiments, selecting the appropriate feedback may involve selecting a link to an online resource (such as a link to a specific page/frame of a video hosting site such as Youtube™ or of a social media platform).

In step 608, the feedback is provided via the internet from the cloud-based analysis server to the local platform (which then provides the feedback to the player as discussed in connection with FIG. 5).

As in the case of FIG. 5, the steps of FIG. 6 are preferably performed in a completely automatic manner (i.e., without requiring human intervention except for perhaps initial configuration and/or ongoing systemic operation/maintenance). For each sensing/transmitting/feedback cycle (e.g., for a golf stroke and every subsequent golf strokes), the steps of FIG. 6 are preferably performed automatically (i.e. without required human intervention). However, it is possible to optionally flag certain input data such that a human expert can optionally inject human feedback (e.g., for players who are important customers or players who need specific help). Such optional human involvement is not precluded, but is not absolutely required.

As can be appreciated from the foregoing, embodiments of the invention enable the implementation of multi-component sensing and analysis systems and methods using a combination of localized sensing/computation/communication platform, cloud-based analysis engine via the internet, and cloud-based feedback database. The use of the localized sensing/computation/communication platform enables data collection to be performed where the player and play object (e.g., ball and/or club) are located.

Centralizing the analysis engine on servers that are centralized in a remote manner from the various local platforms enables scalability as multiple platforms can communicate with a single centralized analysis engine via the internet. Cloud-based technology is leveraged for load balancing, efficient bandwidth demand handling, and substantially infinite scalability as additional analysis servers can be easily added to handle any number of local platforms.

Centralizing the analysis engine also facilitates simplified maintenance since it is unnecessary to track the version of the analysis application software at the local platform, and it is no longer necessary to access each local platform to update its analysis application software from time to time. Additionally, centralizing the analysis engine also simplifies the hardware requirement at the local platform. This is because timely analysis tends to be computationally intensive, especially when substantially immediate feedback is required, and tends to require one or more powerful processors and a large amount of onboard memory. Eliminating the need to perform the analysis of play object motion and player motion locally made powerful processors and large onboard memory unnecessary at the local platform.

Centralizing the feedback database (which contains for example feedback information such as corrections, instructions and/or links to other online feedback resources) also facilitates simplified maintenance since it is unnecessary to track the version of the feedback database at the local platform, and it is no longer necessary to access each local platform to update its feedback database from time to time.

Additionally, centralizing the feedback database also simplifies the hardware requirement at the local platform. This is because the feedback database can be massive to handle all possible scenarios and tends to require a large amount of memory for storing the feedback information. Eliminating the need to have the feedback database at the local platform made large local memory devices unnecessary at the local platform. Again, cloud-based technology is leveraged for load balancing, efficient bandwidth demand handling, and substantially infinite scalability as additional database servers can be easily added to handle any number of local platforms.

More importantly, the entire data chain (e.g., from position/motion data collection pertaining to the play objects and/or the players at the local platforms to transmitting to/from the centralized analysis engines to performing the actual analysis itself to selecting feedback information based on analysis results to transmitting the feedback information back to the local platform to displaying the feedback information to the player) may be performed automatically (i.e., without human intervention). At most, humans may turn on the local platform but after the local platform is powered up and connected to the internet, all further data sensing and feedback may be performed completely without human intervention for each data sensing/data analysis/skill feedback cycle (e.g., each time the player hits the golf ball). Removing the human from the data sensing/data analysis/skill feedback loop improves feedback quality and consistency as human-induced errors are eliminated.

Furthermore, removing the human from the data sensing/data analysis/skill feedback cycle greatly improves scalability. Additional players can be readily accommodated (as long as the player has access to the local platform and an internet connection) by the cloud-based analysis engine and databases (which has the inherent advantages in scalability that virtual remote servers offer), and it is unnecessary to hire additional expensive human coaches when additional players are involved.

While this invention has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

What is claimed is:

1. A method for generating feedback to a human practitioner practicing a skill, comprising:
providing a local platform for acquiring physical parameter data pertaining to motion and position of said human practitioner and motion and position of a golf club and a golf ball struck by said golf club during a golf swing by said human practitioner, wherein providing the local platform comprises:
providing a laser grid, said laser grid acquiring said physical parameter data of said motion and position of said golf club and said golf ball struck by said golf club during said golf swing; and
providing a video camera to acquire said physical parameter data associated with said motion and position of said human practitioner during said golf swing, wherein said physical parameters data associated with said motion and position of said human practitioner being processed to identifying body parts of said human practitioner during said golf swing, divide said physical parameters data associated with said motion and position of said human practitioner during said golf swing into a plurality of individual video frames over a predetermined timeframe, wherein each individual video frame is divided into a plurality of subframes, each subframe of the plurality of subframes focused on a predetermined body part, wherein the plurality of video frames are processed to remove background imagery;
transmitting via the internet at least a portion of said physical parameter data of said motion and position of said golf club and said golf ball struck by said golf club during said golf swing and said physical parameter data associated with said motion and position of said human practitioner during said golf swing from said local platform to a cloud-based analysis engine, said cloud-based analysis engine implemented via a cloud-based paradigm and is located remotely relative to said local platform, said cloud-based analysis engine comparing said physical parameter data of said motion and position of said golf club and said golf ball struck by said golf club during said golf swing and said physical parameter data associated with said motion and position of said human practitioner during said golf swing to a predefined parameters and generating feedback;
receiving via the internet said feedback from said cloud-based analysis engine; and
providing said feedback to said human practitioner using at least one of an audio device operatively coupled with said local platform and a visual display operatively coupled with said local platform, wherein said visual display showing and comparing at least one corresponding sub-frame from said videos frames to a base model showing proper position of the predetermined body part during said golf swing.

2. The method of claim 1 wherein said physical parameter data pertaining to motion and position of said golf club and said golf ball struck by said golf club comprises at least one of a velocity and acceleration of said golf club.

3. The method of claim 1 wherein said physical parameters data associated with said motion and position of said human practitioner being processed to identifying body parts of said human practitioner during said golf swing comprises identifying a head, arms, waist, and legs of said human practitioner during said golf swing.

4. The method of claim 1 wherein said laser grid comprises a pair of emitters located on a ceiling and a detector array located on a floor to form said laser grid.

5. The method of claim 1 wherein said video camera acquires said physical parameter data of said motion and position of said golf club and said golf ball struck by said golf club during said golf swing.

6. The method of claim 1 wherein said physical parameter data associated with said motion and position of said human practitioner comprises at least one of velocity and acceleration of at least a bodily part of said human practitioner.

7. The method of claim 1 wherein said physical parameter data of said motion and position of said golf club and said golf ball struck by said golf club during said golf swing and said physical parameter data associated with said motion and position of said human practitioner are provided from said local platform as two separate data streams.

8. The method of claim 1 wherein said physical parameter data of said motion and position of said golf club and said golf ball struck by said golf club during said golf swing and said physical parameter data associated with said motion and position of said human practitioner is adapted for transmission to or use by said cloud-based analysis engine.

9. The method of claim 1 wherein said feedback for a given golf swing by said human practitioner is obtained and provided to said human practitioner without intervention by any other human being from the moment the given golf swing begins to the moment providing feedback pertaining to the given golf swing is completed.

10. A method for generating feedback to a human practitioner practicing a skill, comprising:
   providing a cloud-based analysis engine;
   receiving via the internet physical parameter data pertaining to motion and position of said human practitioner and motion and position of a golf club and a golf ball struck by said golf club during a golf swing by said human practitioner monitored by a laser grid formed on a local platform and pertaining to motion and position of said human practitioner during said golf serving monitored by a video camera of said local platform, wherein said physical parameters data associated with said motion and position of said human practitioner is divided into a plurality of individual video frames over a predetermined timeframe, wherein each individual video frame is divided into a plurality of sub-frames wherein each sub-frame being processed to identifying one of a head, arms, waist, and legs of said human practitioner during said golf swing, and process said physical parameters data associated with said motion and position of said human practitioner during said golf swing to remove background imagery;
   analyzing said physical parameter data to generate said feedback by comparing corresponding sub-frames from the videos frames to a base model showing proper position of the predetermined body part during said golf swing; and
   providing said feedback via the Internet to said local platform by having a visual display showing and comparing at least one corresponding sub-frame from the videos frames to a base model showing proper position of a predetermined body part shown in the at least one corresponding sub-frame during said golf swing.

11. The method of claim 10 wherein said physical parameter data associated with said motion and position of said human practitioner comprises at least one of a velocity and acceleration of at least a bodily part of said human practitioner.

12. The method of claim 10 wherein said feedback for a given golf swing by said human practitioner is obtained and provided to said human practitioner without intervention by any other human being from the moment the given golf swing begins to the moment providing feedback pertaining to the given golf swing is completed.

13. The method of claim 10 wherein said cloud-based analysis engine performs analysis on behalf of multiple local platforms via the internet.

14. The method of claim 10 wherein said feedback includes at least one link to an online resource, said link providing content to said human practitioner for feedback purposes.

15. The method of claim 14 wherein said online resource includes at least one of a video hosted by a video hosting site and specific content hosted on a social media site.

16. A method for generating feedback to a human practicing golf strokes, comprising:
   providing a knowledge-based instruction engine, said knowledge-based instruction engine implemented on a set of host servers in accordance with a cloud-based paradigm; providing a database of data pertaining to motion of a golf club and at least one human body part;
   receiving via the internet physical parameter data from a local platform, said physical parameter data pertaining to motion and position of said human practitioner and motion and position of said golf club and a golf ball struck by said golf club during a golf swing by said human practitioner monitored by a laser grid formed on a local platform and pertaining to motion and position of said human practitioner during said golf swing monitored by a video camera of said local platform, wherein said physical parameters data associated with said motion and position of said human practitioner being divided into a plurality of individual video frames over a predetermined timeframe, wherein each individual video frame is divided into a plurality of sub-frames, wherein each sub-frame in each individual video frame processed to identifying one of a head, arms, waist, and legs of said human practitioner during said golf swing, and process said physical parameters data associated with said motion and position of said human practitioner during said golf swing to remove background imagery;
   analyzing, using said knowledge-based instruction engine, said physical parameter data to generate said feedback, wherein said analyzing also includes utilizing said database; and
   providing said feedback via the internet to said local platform by having a visual display show a plurality of corresponding sub-frames from the videos frames and a base model showing proper position of predetermined body parts during said golf swing.

17. The method of claim 16 wherein said feedback includes at least one link to an online resource, said link providing content to said human for feedback purposes.

18. The method of claim 17 wherein said online resource includes at least one of a video hosted by a video hosting site and specific content hosted on a social media site.

* * * * *